United States Patent
Greenwold (12) 
(10) Patent No.: US 6,845,215 B1
(45) Date of Patent: Jan. 18, 2005

(54) BODY-CARRYABLE, DIGITAL STORAGE MEDIUM, AUDIO/VIDEO RECORDING ASSEMBLY

(76) Inventor: James Greenwold, P.O. Box 191, Chippewa Falls, WI (US) 54729

( * ) Notice: Subject to any disclaimer, the term of this patent is extended or adjusted under 35 U.S.C. 154(b) by 97 days.

(21) Appl. No.: 10/294,003

(22) Filed: Nov. 14, 2002

Related U.S. Application Data
(60) Provisional application No. 60/346,469, filed on Jan. 9, 2002.

(51) Int. Cl.$^7$ .............................. H04N 5/85; H04N 7/04
(52) U.S. Cl. ........................ 386/124; 386/125; 386/104
(58) Field of Search .......................... 386/96, 104, 105, 386/106, 124, 125, 126, 107, 117, 118, 45, 46, 39, 40, 1; 360/32; H04N 5/85, 7/04

(56) References Cited

U.S. PATENT DOCUMENTS

| | | | |
|---|---|---|---|
| 4,516,157 A | * | 5/1985 | Campbell |
| 4,831,438 A | | 5/1989 | Bellman, Jr. et al. |
| 4,833,534 A | | 5/1989 | Paff et al. |
| 4,887,080 A | | 12/1989 | Gross |
| 4,963,962 A | | 10/1990 | Kruegle et al. |
| 5,111,288 A | | 5/1992 | Blackshear |
| 5,134,499 A | * | 7/1992 | Sata et al. .................. 386/125 |
| 5,666,157 A | | 9/1997 | Aviv |
| 5,886,738 A | | 3/1999 | Hollenbeck et al. |
| 5,995,004 A | | 11/1999 | Pellowski |
| 6,057,966 A | | 5/2000 | Carroll et al. |
| 6,222,503 B1 | | 4/2001 | Gietema et al. |
| 6,259,476 B1 | | 7/2001 | Greene |
| 6,392,704 B1 | | 5/2002 | Garcia-Ortiz |
| 6,456,321 B1 | | 9/2002 | Ito et al. |
| 6,462,775 B1 | | 10/2002 | Loyd et al. |

FOREIGN PATENT DOCUMENTS

JP 8-163415 * 12/1994

* cited by examiner

*Primary Examiner*—Robert Chevalier
(74) *Attorney, Agent, or Firm*—Tipton L. Randall (57) ABSTRACT

The invention is directed to a body-carryable, digital storage medium audio/video recording assembly, including an analog audio/video generating source producing an audio/video signal. A conductor means transmits the audio/video signal to an audio/video signal recording assembly device for recording the audio/video signal. The recording device assembly includes an audio/video signal input means, a date/time stamp means for the input audio/video signal, an analog/digital and digital/analog converter means, an integrated circuit processor means, and, for example, a digital hard-drive storage assembly with a removable hard drive member therein. Also included is a battery means for powering the recording device assembly and an audio/video signal output means. The entire camera and recording assembly is concealable on the body of an individual for covert recording of events.

17 Claims, 8 Drawing Sheets

BODY-CARRYABLE, DIGITAL STORAGE MEDIUM, AUDIO/VIDEO RECORDING ASSEMBLY

CROSS-REFERENCE TO RELATED APPLICATIONS, IF ANY

This application claims the benefit under 35 U.S.C. §119 (e) of co-pending provisional application Ser. No. 60/346,469, filed 9 Jan. 2002. Application Ser. No. 60/346,469 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to an audio/video recording assembly and, more particularly, to such an assembly suitable for concealment on an individual's body for covertly recording events.

2. Background Information

The recording of audio/video data is a well-known technology. A wide variety of video cameras are available to consumers. These cameras employ/video tape as the recording medium and the recorded events can be viewed on a monitor coupled to a video cassette player/recorder which is also commercially available. Generally, the consumer video cameras are relatively large in size and not easily concealed by an individual should specific events wish to be covertly recorded. Viewing the recorded events from a video tape may require much playing and rewinding of the tape when a specific event is to be viewed.

Applicants have invented a body-carryable, digital storage medium, audio/video recording assembly that is usable for covertly recording events and then providing random access to the stored audio/video data.

SUMMARY OF THE INVENTION

The invention is directed to a body-carryable, digital storage medium, audio/video recording assembly. The assembly includes an analog audio/video generating source producing an audio/video signal. There is conductor means for transmitting the audio/video signal from the audio/video signal source to an audio/video signal recording assembly device for receiving and recording the audio/video signal. The recording device assembly includes an audio/video signal input means, a date/time stamp means for the input audio/video signal, an analog/digital and digital/analog converter means, an integrated circuit processor means, and a removable, randomly accessible, digital storage medium. Also included is a battery means for powering the recording device assembly and an audio/video signal output means.

An analog audio/video signal from an audio/video source input to the recording device assembly is converted to a digital audio/video signal by the analog/digital converter means. The digital audio/video signal is stored on the removable, digital storage medium, such as a hard drive member of a digital hard drive storage assembly, with the stored digital audio/video signal randomly accessible via the integrated circuit processor means. The accessed audio/video digital signal is converted to an analog audio/video signal by the digital/analog converter means and is accessible to an audio/video display device connected to the recording device assembly via the audio/video signal output means.

DESCRIPTION OF THE EMBODIMENTS

Nomenclature

10 Digital Storage Audio/Video Recording Assembly
15 Analog Audio/Video Generating Source
20 Conductor Means 25 Recording Device Assembly
30 Audio/Video Signal Input Means;
35 Date/Time Stamp Means
40 Analog/Digital Converter Means
40a Video A/D Component
40b Audio A/D Component
45 Digital/Analog Converter Means
50 Integrated Circuit Processor Means
55 Digital Hard Drive Storage Assembly with Hard Drive Member
60 Battery Means
65 Audio/Video Signal Output Means
70 Audio/Video Output Device
75 RF Receiver Component
80 Hard Drive Member
85 PCMCIA Interface
90 ATA Connector
95 ATA Connector
100 Shield Member
105 Start/Pause/Stop Control
110 Status Indicator Light
115 Access Port
120 Shield Top Portion
125 Coax Switch Connector
130 Antenna
150 Printed Circuit Board
155 Encoder Section
160 Power Switch
165 Power Supply Panel
170 Battery Charger Hookup
200 Fluid-Tight Case Member
210 Inner Portion of Case Member
215 Side Sections of Inner Portion
220 Exterior Channel of Side Sections
225 End Sections of Inner Portion
230 Pin Member of End Sections
250 Outer Portion of Case Member
255 Sections of Outer Portion
260 Pin-Accepting Aperture of Outer Portion
265 Thumb Screw Members Construction Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
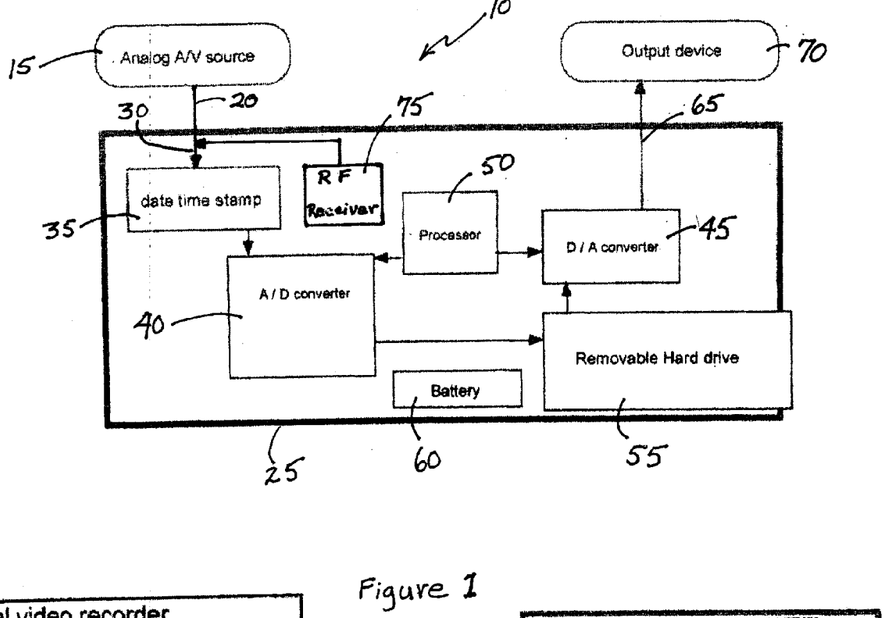
FIG. 1 is a functional block representation of the hard drive audio/video recording assembly of the present invention.

Referring to the FIG. 1, the body-carryable, digital storage medium, audio/video recording assembly 10 is shown in functional block diagram form. The body-carryable, digital storage medium, audio/video recording assembly 10 includes an analog audio/video generating source 15, such as a miniature camera, which produces a video signal and an audio signal. There is a conductor means 20, such as a wire or cable, for transmitting the audio/video signal from the audio/video signal source 15 to an audio/video signal recording assembly device 25 for receiving and recording the audio/video signal. The recording device assembly 25 includes an audio/video signal input means 30, a date/time stamp means 35 for dating the input audio/video signal, an analog/digital converter means 40 and a digital/analog converter means 45, for converting the analog signal from the generating source 15 to a digital signal and for converting the digital signal back to an analog signal for later viewing. An integrated circuit processor means 50 controls the signal conversions and storage thereof. A removable, random accessible digital storage medium, such as a digital hard drive storage assembly 55 having a removable hard drive member 80 therein, records the digital signal. Also included is a battery means 60 for powering the recording device assembly 10 and an audio/video signal output means 65 to conduct the stored audio/video signals to an output device 70, such as a monitor, for viewing.

An analog audio/video signal from the audio/video source 15 input to the recording device assembly 25 is converted to a digital audio/video signal by the analog/digital converter means 40. The digital audio/video signal is stored on the hard drive member 80 of the digital hard drive storage assembly 55. The stored digital audio/video signal is randomly accessible via the integrated circuit processor means 50. The accessed audio/video digital signal is converted to an analog audio/video signal by the digital/analog converter means 45 and is viewed on an audio/video display device 70 connected to the recording device assembly 25 via the audio/video signal output means 65.

The integrated circuit processor means 50 provides random access to the digital data stored on the hard drive member 80 of the hard drive assembly 55 so that various segments of recorded events can be readily accessed. The integrated circuit processor means 50 also contains control software for audio/video compression and decompression and recording. Further, the hard drive member 80 can be readily removed from the hard drive assembly 55 when the hard drive member 80 is full. Inserting a fresh hard drive member 80 provides extended recording and archiving capabilities.

The audio/video camera 15 is sufficiently small that it is easily concealed on the body of an individual. Likewise the recording device assembly 25 is small enough for facile concealment on the body of an individual. The conducting member 20 between the camera 15 and the recording device assembly is preferably a hard conductor to prevent detection of a signal transmitted through space. A low power RF transmitter (not shown), associated with the analog A/V source 15, and an RF receiver 75 may be substituted for the conducting member 20 for certain application with comparable results. The RF receiver 75 provides the audio/video signal input means 30 for the recording device assembly 25.

Figure 2:
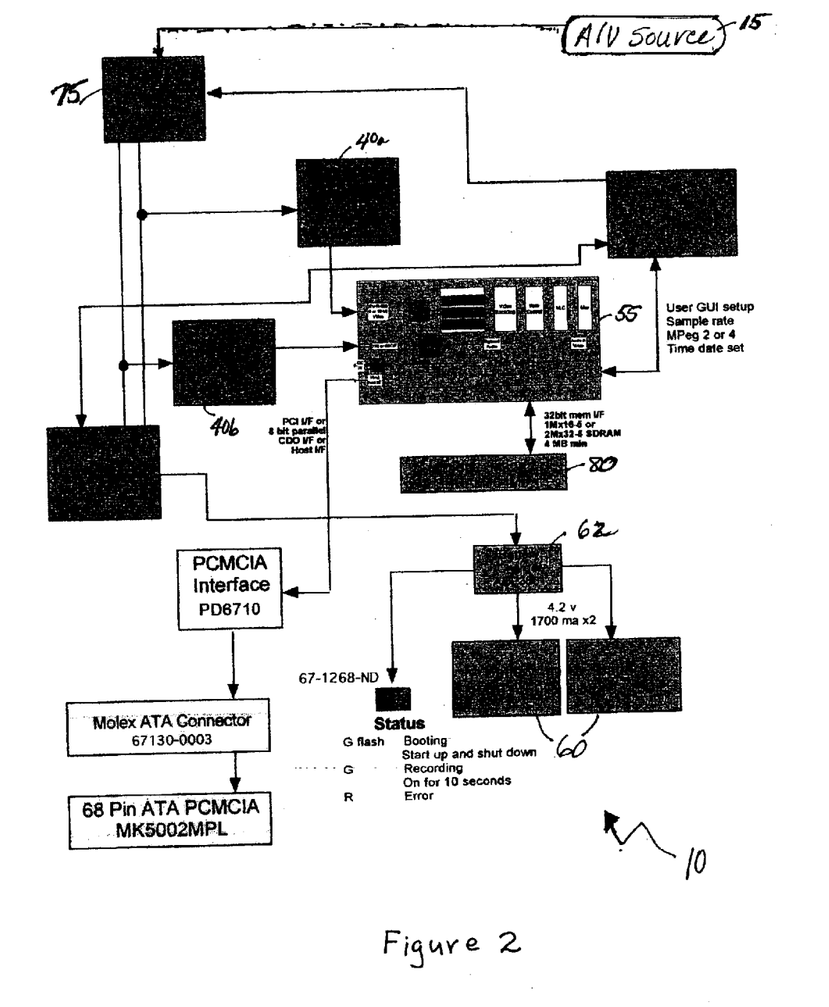
FIG. 2 is a component block representation of the hard drive audio/video recording assembly of the present invention.

Referring now to FIG. 2, a more detailed functional block diagram of the recording assembly 10 is shown. The analog audio/video generating source 15 is a miniature camera with audio input capabilities and available from BTS. In this embodiment, the A/V source 15 transmits a signal to the A/V RF receiver 75. The analog video signal is converted to digital form by the video A/D component 40a, available from Philips, while the analog audio signal is converted to digital form by the audio A/D component 40b, also available from Philips. The digital audio and video signals, under the control of the integrated circuit processor 50, are encoded and compressed into mpg format and passed to the hard drive assembly 55 for storage on the hard drive member 80. The integrated circuit processor 50 is available from Cirrus, and the hard drive assembly 55 is available from Toshiba.

In a preferred embodiment of the invention, power for the unit is provided by a pair of rechargeable batteries 60 available from Sanyo. A charger adapter 62 is available for recharging the batteries from a suitable outside power source.

Power to the system is provided by charging the battery pack 60 via an external power pack available from Astrodyne.

The hard drive assembly 55 is available from Toshiba and has a hard drive member 80 with at least 512 Mb of storage space. The digital audio/video data are accessed from the hard drive member 85 via a PCMCIA interface 85 with the signal passing through an ATA connector 90 to a 68-pin ATA PCMCIA 95, then converted back to an analog signal for display on an output device 70.

Figure 3:
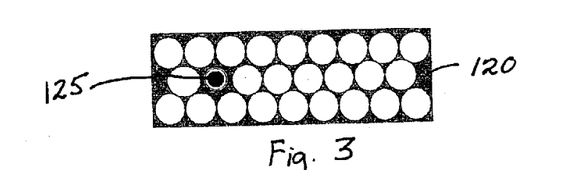
FIG. 3 is a top view of the hard drive audio/video recording assembly within a partially enclosing shield member.
Figures 4, 5, 6:
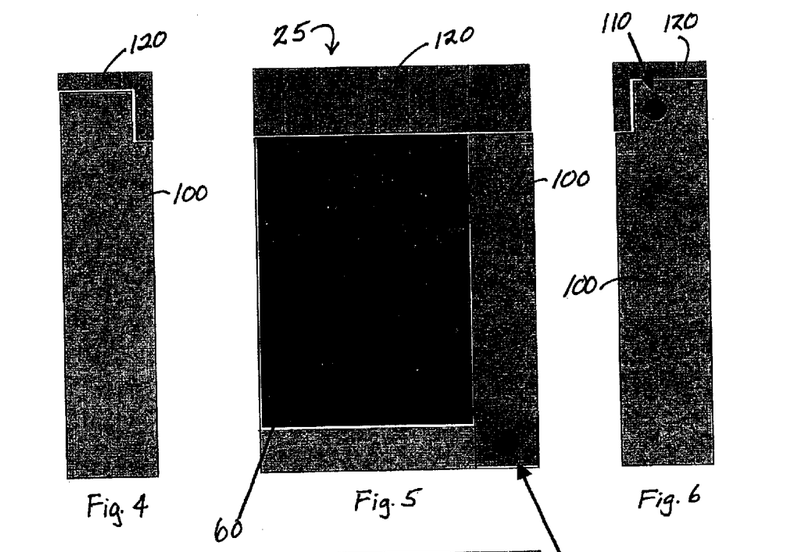
FIG. 4 is one side view of the hard drive audio/video recording assembly within a partially enclosing shield member.
FIG. 5 is a front view of the hard drive audio/video recording assembly within a partially enclosing shield member.
FIG. 6 is another side view of the hard drive audio/video recording assembly within a partially enclosing shield member.
Figure 7:
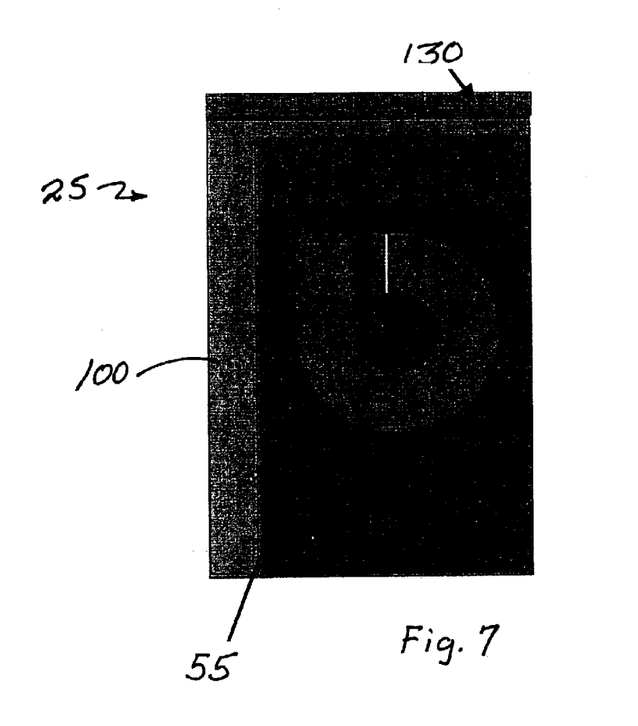
FIG. 7 is a back view of the hard drive audio/video recording assembly within a partially enclosing shield member.
Figure 8:
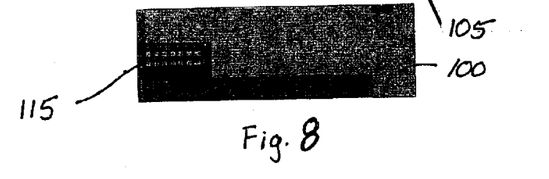
FIG. 8 is a bottom view of the hard drive audio/video recording assembly within a partially enclosing shield member.
Figure 9:
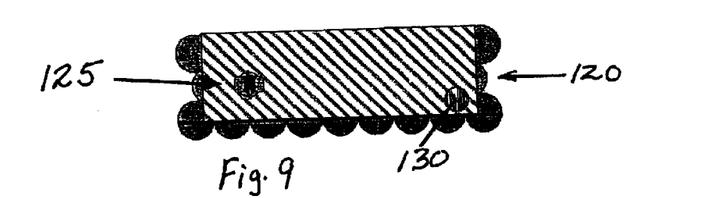
FIG. 9 is a bottom view of the shield top portion of the partially enclosing shield member.

In order for the hard drive, audio/video recording assembly 10 to be carried on the body of an individual without drawing attention, the recording device assembly 25 is configured to occupy a small volume. One embodiment of the configuration of the components of the recording device assembly 25 is shown in FIGS. 3–8 where several views of the recording device assembly 25 are provided. FIG. 5 is a front view of the assembly 25 while FIG. 3 is a top view and FIG. 8a bottom view. FIG. 7 provides a rear view and FIGS. 4 and 6 are left side and right side views, respectively. The recording device assembly components are secured within a partially enclosing shield member 100 to protect the components from damage. To minimize the dimensions of the recording device assembly 25, the battery pack 60 forms a portion of the exterior of the front and the hard drive assembly 55 forms most of the exterior of the back and a portion of the bottom thereof. This configuration allows facile access to the hard drive assembly 55 for exchanging the hard drive members 80. There is a start/pause/stop control button 105 on the front, and a status indicator light 110 on the right side. An access port 115, such as a 14 pin Molex, is located on the bottom side of the assembly 25 for connection with an external docking port, such as a video monitor. The top portion 120 of the shield member 100 contains a switch/connector 125 for connecting the internal RF receiver with an external antenna (not shown), at the same time disconnecting the internal antenna 130, with the shield top portion 120 resembling the filters of a package of cigarettes. The shield top portion 120 includes an internal antenna 130 connected to the RF component 75 of the assembly 25, as shown in FIG. 9, which is a bottom view of the shield top portion 120.

Figure 10:
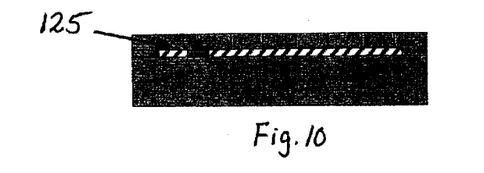
FIG. 10 is back view of the shield top portion of the partially enclosing shield member.
Figure 11:
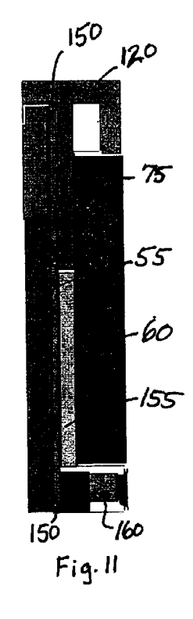
FIG. 11 is a side view of the hard drive audio/video recording assembly with the shield top portion of the partially enclosing shield member.
Figure 12:
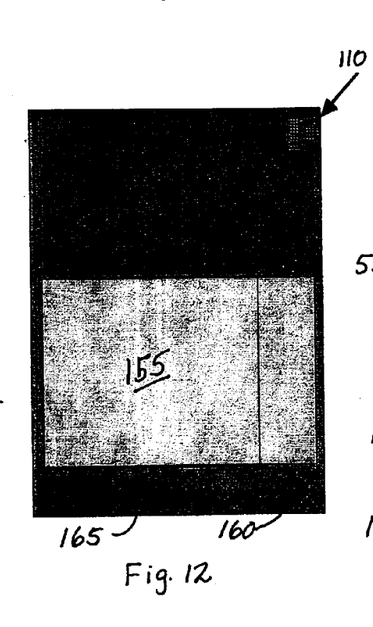
FIG. 12 is a sectional view along line 12–12' of FIG. 13 of the hard drive audio/video recording assembly with the shield top portion of the partially enclosing shield member.
Figure 13:
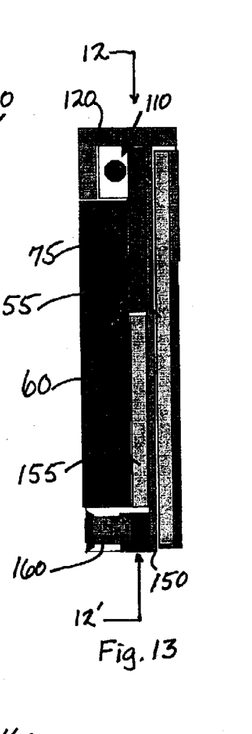
FIG. 13 is another side view of the hard drive audio/video recording assembly with the shield top portion of the partially enclosing shield member.
Figure 14:
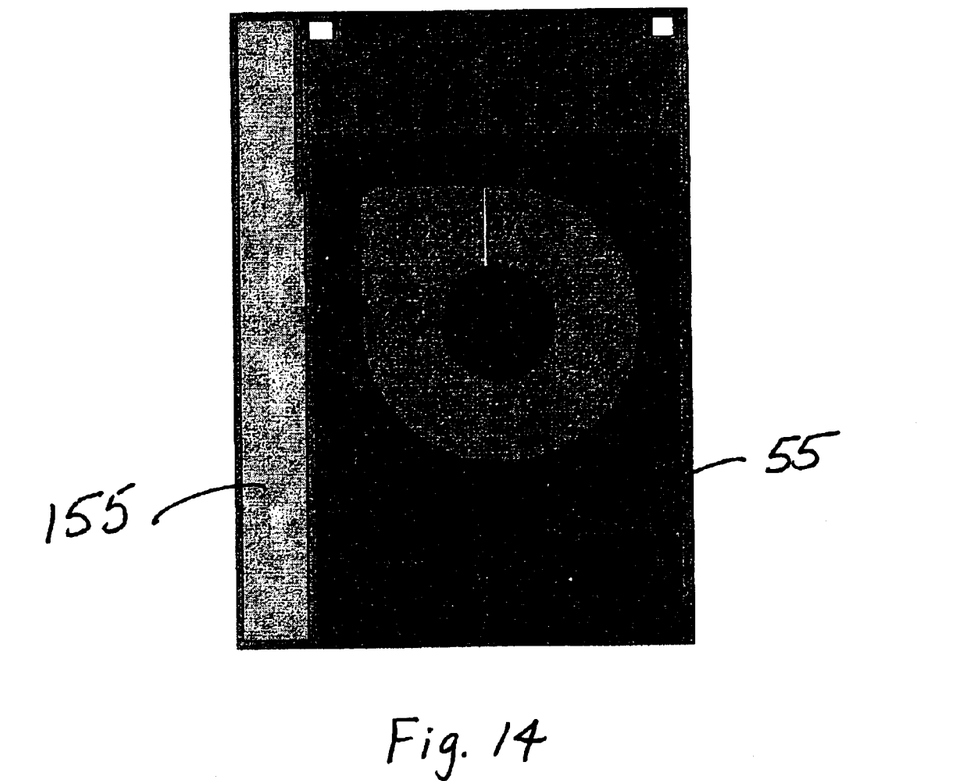
FIG. 14 is a back view of the hard drive audio/video recording assembly with the shield top portion of the partially enclosing shield member.
Figure 15:
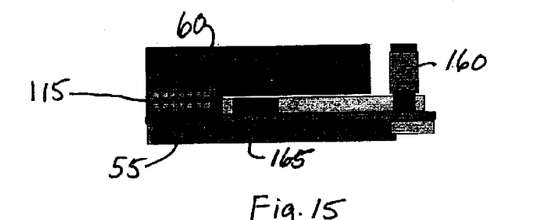
FIG. 15 is a bottom view of the hard drive audio/video recording assembly with the shield top portion of the partially enclosing shield member.

Referring now to FIGS. 10–15, various views of the assembled components of the recording device assembly 25 are shown without the enclosing shield member 100. FIGS. 10 and 15 are top and bottom views of the assembly 25, respectively, and FIGS. 11 and 13 are left side and right side views of the assembly 25, respectively. FIG. 14 is a back view of the recording device assembly 25, while FIG. 12 is a sectional view along line 12–12' of FIG. 13. The recording device assembly 25 has dimensions of about 68 mm in width, about 94 mm in height and a depth of about 22 mm. A printed circuit board 150 provides a framework for mounting the components with the encoder section 155 and the RF section 75 secured thereto on one side. The batteries 60 are mounted as a pack atop the encoder section 155 and RF section 75 while the hard drive assembly 55 is secured to the printed circuit board 150 on the side opposite the encoder and RF sections. A power switch 160 on the power supply panel 165 activates and deactivates the recording device assembly 25 with an LED status indicator 110 adjacent the top for easy reference. A battery charger hook up 170 services the rechargeable battery pack 60.

The assembly 25 is sized to removably fit into a standard cigarette box and is provided with a camouflage top portion cover 120 resembling cigarette filters that covers the top of the assembly 25 when positioned within the cigarette box (not shown). The camouflage cover 120 includes an internal antenna 130 within and a coax switch/connector 125 for connection to an external antenna (not shown) and switching off the internal antenna 130.

Additionally, a fluid-tight case member 200 is provided which securely encloses the shield-clad recording device assembly 25 to protect it from the elements. The case member 200 is shown in detail in FIGS. 16–19 and comprises the internal audio/video recording assembly 25 and the external shield encasing shell 200, which connects the PC board to the interface with external devices.

Figure 16:
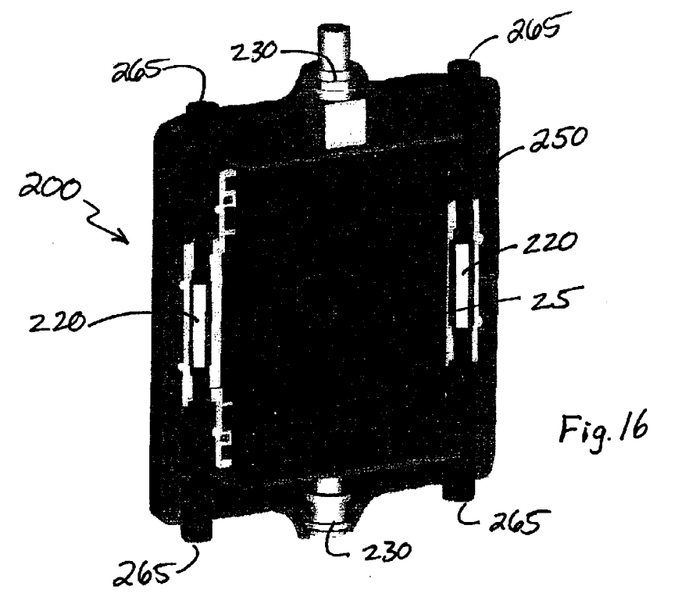
FIG. 16 is a cutaway view of the case member enclosed hard drive audio/video recording assembly.
Figure 17:
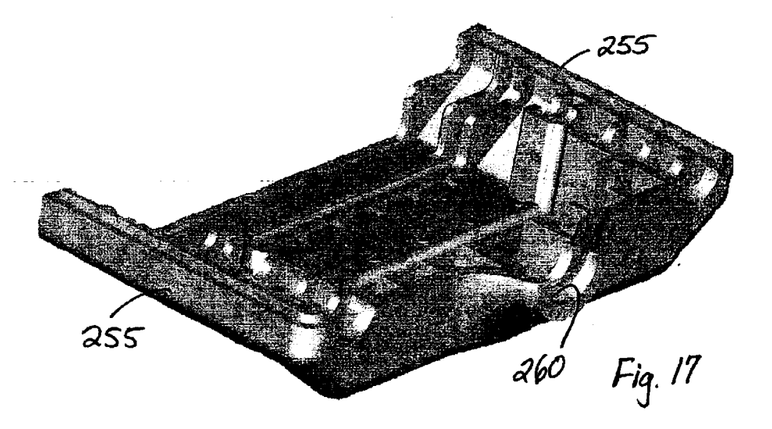
FIG. 17 is a perspective view of one section of the outer portion of the case member.
Figure 18:
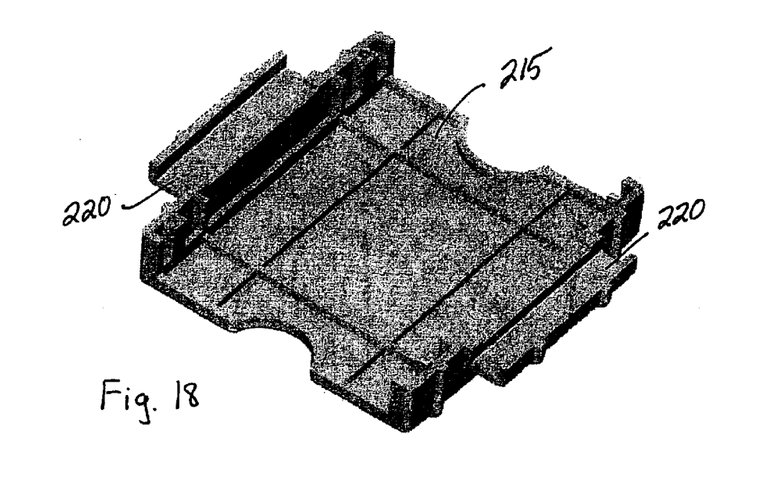
FIG. 18 is a perspective view of one section of the inner portion of the case member.
Figure 19:
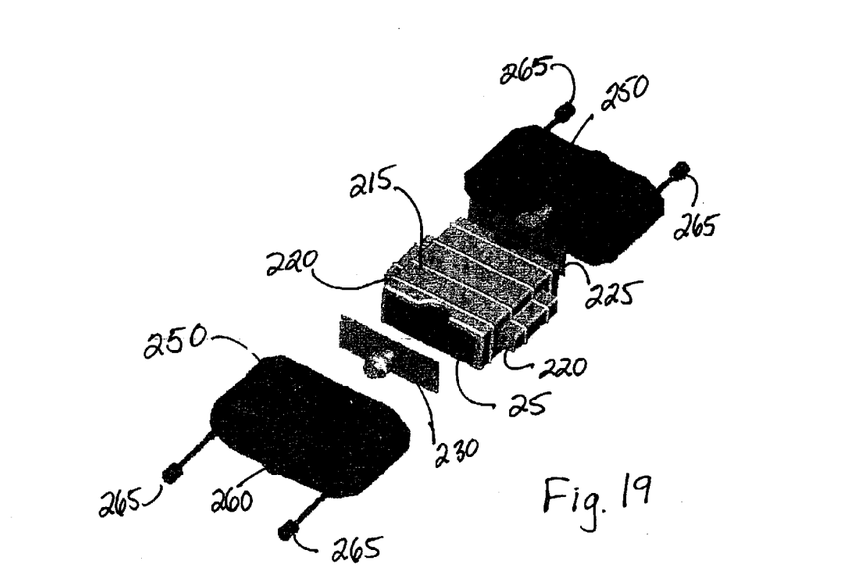
FIG. 19 is an exploded view of the case member enclosing the hard drive audio/video recording assembly.

Referring now to FIG. 16, a cutaway view of the case member 200 enclosing an audio/video recording assembly 25 is shown. The case member 200 is composed of an inner portion 210 and an outer portion 250. As shown in FIG. 18, the case inner portion 210 includes a pair of mating side sections 215 that fit together around the recording assembly 25. The side sections 215 form exterior channels 220 on opposed sides of the case inner portion 210, best seen in FIG. 19. The open ends of the case inner portion 210 are each covered by an end section 225, each having a protruding pin member 230 that connects each end section 225 to the case outer portion 250. The case outer portion 250 is composed of two pairs of mating sections 255 shown in FIG. 17. Each pair of sections 255 forms half of the case outer portion 250. Each pair of sections 255 includes a pin-accepting aperture 260 that mates with a pin member 230 of the inner end section 230. Each pair of sections 255 also includes a pair of thumb screw members 265 that extend into one end of one exterior channel 220 of the case member inner portion 210. Thumb screw members 265 from opposed pairs of sections 255 engage within the exterior channel 220 to securely fasten the pairs of sections 255 together about the case inner portion 210, as well as secure the inner end sections 225 of the case inner portion 210 against the side sections 215 thereof. The multilayer case member 200 provides a secure barrier to the environment exterior the case member 200. The multilayer case member 200 allows for concealment of the recording device assembly 25 in an obscure location, such as burial in the ground. In this embodiment, the analog audio/video signal is transmitted from the camera 15 via an RF signal, which is picked up by the RF receiver component 75 of the recording device assembly 25.

While the invention has been particularly shown and described with reference to preferred embodiments thereof, it will be understood by those skilled in the art that various changes in form and details may be made therein without departing from the spirit and scope of the invention.

What is claimed is:

1. A recording device assembly for receiving and recording an audio/video signal, the recording device assembly including;
   (i) audio/video signal input means;
   (ii) date/time stamp means for the input audio/video signal;
   (iii) analog/digital and digital/analog converter means;
   (iv) integrated circuit processor means;
   (v) a removable, randomly accessible, digital storage medium assembly;
   (vi) battery means for powering the recording device assembly; and
   (vii) audio/video signal output means;
   the recording device assembly comprising a unitary package having dimensions of about 68 mm in width, about 94 mm in height a depth of about 22 mm, the recording device assembly adapt for concealment on an individual's body, whereby an analog audio/video signal from an audio/video source input to the recording device assembly is converted to a digital audio/video signal by the analog/digital converter means, the digital audio/video signal is stored on the randomly accessible, digital storage medium assembly, the stored digital audio/video signal is randomly accessible via the integrated circuit processor means, the accessed audio/video digital signal is converted to an analog audio/video signal by the digital/analog converter means, and is accessible to an audio/vide display device connectable to the recording device assembly via the audio/video signal output means.

2. The recording device assembly according to claim 1 wherein the audio/video signal input means includes a radio frequency (RF) receiver.

3. The recording device assembly according to claim 1 wherein the audio/video signal input means includes a hard wire electrical conductor.

4. The recording device assembly according to claim 1 wherein the removable, randomly accessible, digital storage medium assembly includes a digital hard drive storage assembly with a hard drive member therein, the hard drive member removable from the hard drive storage assembly.

5. The recording device assembly according to claim 1 further including a fluid-tight case member enclosing the recording device assembly.

6. The recording device assembly according to claim 5 wherein the fluid-tight case member includes a case inner portion adjacent the recording device assembly and a case outer portion encasing the inner portion and recording device assembly.

7. A recording device assembly for receiving and recording an audio/video signal, the recording device assembly including;
(i) audio/video signal input means;
(ii) date/time stamp means for the input audio/video signal;
(iii) analog/digital and digital/analog converter means;
(iv) integrated circuit processor means;
(v) a randomly accessible, digital hard drive storage assembly with a removable hard drive member therein;
(vi) battery means for powering the recording device assembly; and
(vii) audio/video signal output means;
the recording device assembly comprising a unitary package having dimensions of about 68 mm in width, about 94 mm in height and a depth of about 22 mm, the recording device assembly adapted for concealment on an individual's body, whereby an analog audio/video signal from an audio/video source input to the recording device assembly is converted to a digital audio/video signal by the analog/digital converter means, the digital audio/video signal is stored on the randomly accessible, digital storage medium assembly, the stored digital audio/video signal is randomly accessible via the integrated circuit processor means, the accessed audio/video digital signal is converted to analog audio/video signal by the digital/analog converter means, and is accessible to an audio/vide display device connectable to the recording device assembly via the audio/video signal output means.

8. The recording device assembly according to claim 7 wherein the audio/video signal input means includes a radio frequency (RF) receiver.

9. The recording device assembly according to claim 7 wherein the audio/video signal input means includes a hard wire electrical conductor.

10. The recording device assembly according to claim 7 further including a fluid-tight case member enclosing the recording device assembly.

11. The recording device assembly according to claim 10 wherein the fluid-tight case member includes a case inner portion adjacent the recording device assembly and a case outer portion encasing the inner portion and recording device assembly.

12. A body-carryable, digital storage medium, audio/video recording system, comprising:
(a) an analog audio/video generating source producing au audio/video signal;
(b) means for transmitting the audio/video signal from the audio/video signal source to an audio/video signal recording device assembly; and
(c) a recording device assembly receiving and recording the audio/video signal, the recording device assembly including;
(i) audio/video signal input means;
(ii) date/time stamp means for the input audio/video signal;
(iii) analog/digital and digital/analog converter means;
(iv) integrated circuit processor means;
(v) a removable, randomly accessible, digital storage medium assembly;
(vi) battery means for powering the recording device assembly; and
(vii) audio/video signal output means;
the recording device assembly and audio/video generating source each comprising a unitary package adapted for concealment on an individual's body, the recording device assembly having dimensions of about 68 mm in width, about 94 mm in height and a depth of about 22 mm, whereby an analog audio/video signal from an audio/video source input to the recording device assembly is converted to a digital audio/video signal by the analog/digital converter means, the digital audio/video signal is stored on the hard drive member of the digital hard drive storage assembly, the stored digital audio/video signal is randomly accessible via the integrated circuit processor means, the accessed audio/video digital signal is converted to an analog audio/video signal by the digital/analog converter means, and is accessible to an audio/video display device connectable to the recording device assembly via the audio/video signal output means.

13. The recording device assembly according to claim 12 wherein the audio/video signal input means includes a radio frequency (RF) receiver.

14. The recording device assembly according to claim 12 wherein the audio/video signal input means includes a hard wire electrical conductor.

15. The recording device assembly according to claim 12 wherein the removable, randomly accessible, digital storage medium assembly includes a digital hard drive storage assembly with a hard drive member therein, the hard drive member removable from the hard drive storage assembly.

16. The recording device assembly according to claim 12 further including a fluid-tight case member enclosing the recording device assembly.

17. The recording device assembly according to claim 16 wherein the fluid-tight case member includes a case inner portion adjacent the recording device assembly and a case outer portion encasing the inner portion and recording device assembly.

* * * * *